United States Patent [19]
Lee et al.

[11] Patent Number: 5,974,328
[45] Date of Patent: Oct. 26, 1999

[54] RAPID SYSTEM ACCESS AND REGISTRATION IN MOBILE PHONE SYSTEMS

[75] Inventors: William Chien-Yeh Lee; F. Craig Farrill, both of Danville, Calif.

[73] Assignee: AirTouch Communications, Inc., San Francisco, Calif.

[21] Appl. No.: 08/932,206

[22] Filed: Sep. 17, 1997

Related U.S. Application Data

[60] Provisional application No. 60/035,421, Jan. 13, 1997.

[51] Int. Cl.⁶ .................. H04Q 7/20; H04B 1/18
[52] U.S. Cl. ............... 455/456; 455/434; 455/168.1
[58] Field of Search .................... 455/456, 434, 455/435, 432, 168.1

[56] References Cited

U.S. PATENT DOCUMENTS

| | | | |
|---|---|---|---|
| 3,829,617 | 8/1974 | Caithamer et al. | 379/112 |
| 4,162,377 | 7/1979 | Mearns | 379/127 |
| 4,178,476 | 12/1979 | Frost | 455/31.2 |
| 4,191,860 | 3/1980 | Weber | 379/115 |
| 4,651,156 | 3/1987 | Martinez | 342/457 |
| 4,700,374 | 10/1987 | Bini | 455/456 |
| 4,704,734 | 11/1987 | Menich et al. | 455/562 |
| 4,752,951 | 6/1988 | Konneker | 455/435 |
| 4,756,020 | 7/1988 | Fodale | 379/112 |
| 4,783,780 | 11/1988 | Alexis | 455/455 |
| 4,833,701 | 5/1989 | Comroe et al. | 455/609 |
| 4,918,425 | 4/1990 | Greenberg et al. | 340/539 |
| 4,999,833 | 3/1991 | Lee | 370/312 |
| 5,063,591 | 11/1991 | Jodoin | 455/408 |
| 5,208,756 | 5/1993 | Song | 455/456 |
| 5,212,831 | 5/1993 | Chuang et al. | 455/450 |
| 5,485,615 | 1/1996 | Wennmyr | 395/702 |
| 5,555,551 | 9/1996 | Rudokas et al. | 455/410 |
| 5,649,190 | 7/1997 | Sharif-Askary et al. | 707/101 |
| 5,701,400 | 12/1997 | Amado | 706/45 |
| 5,734,980 | 3/1998 | Hooper et al. | 455/432 |
| 5,737,519 | 4/1998 | Abdelnour et al. | 395/183.15 |
| 5,784,693 | 7/1998 | Barber et al. | 455/434 |
| 5,832,367 | 11/1998 | Bamburak et al. | 455/434 |
| 5,832,394 | 11/1998 | Wortham | 455/456 |

*Primary Examiner*—Dwayne D. Bost
*Assistant Examiner*—Raymond B. Persino
*Attorney, Agent, or Firm*—Gates & Cooper

[57] ABSTRACT

A mobile radio telephone communication systems provides for rapid system access and registration of mobile phones when the mobile phone operates in an area outside of its home service area. A preferred mobile phone system for a mobile phone is identified before the mobile phone originates a call by determining a location for the mobile phone and selecting the preferred system from a database stored in the mobile phone using the determined location.

32 Claims, 4 Drawing Sheets

FIG. 4

| System ID 402 | Location 404 | Frequency Band 406 | Paging Channel 408 |
|---|---|---|---|
| X | X | X | X |
| X | X | X | X |

FIG. 5

| SID 502 | NID 504 | Frequency Band 506 | Paging Channel 508 | # of Calls Used 510 | Last Time 512 | Service Option From the Cell Site 514 |
|---|---|---|---|---|---|---|
| 002 | 35 | Cellular A | 3 | 3 | 12:20 p.m | EVRC |
| — | — | — | — | — | — | — |
| — | — | — | — | — | — | — |

RAPID SYSTEM ACCESS AND REGISTRATION IN MOBILE PHONE SYSTEMS

CROSS REFERENCE TO RELATED APPLICATION

This application claims the benefit under 35 U.S.C. Section 119(e) of the co-pending and commonly-assigned U.S. provisional patent application Ser. No. 60/035,421, filed Jan. 13, 1997, by William C. Y. Lee et al, entitled "Rapid System Access and Registration", which application is incorporated by reference herein.

BACKGROUND OF THE INVENTION

1. Field of the Invention

This invention relates in general to mobile radio telephone communication systems, and more specifically, to rapid system access end registration for mobile phones when the mobile phone operates in an area outside of its home service area.

2. Description of Related Art

Mobile phones, which include cellular phones, personal communications systems (PCS) phones, enhanced specialized mobile radio (ESMR) phones, and other radio telephone technologies, combine the mobility of the radio link and the world-wide land telephone network to provide a mobile communications link to any telephone in the world. As mobile phones have become more prevalent throughout the world, the number of system operators have increased.

A service provider or system operator, such as the assignee AirTouch Communications, Inc. and others, may operate mobile phone systems in different markets using different frequency bands (e.g., different portions of the allocated spectrum) and different types of systems (e.g., FDMA, TDMA, CDMA, PCS, GSM, etc.). When a mobile phone roams outside of its home service area, it is desirable that its calls use a preferred system, e.g., one operated by the same service provider as its home service area or one operated by another service provider having some relationship with the service provider of its home service area. However, the preferred system may be operating within the foreign service area on a different frequency band than the home service area. As a result, the mobile phone must also identify a frequency band and system type associated with a preferred system in a foreign service area to use for its communications.

Generally, a mobile phone identifies a preferred system by scanning for one or more System IDs (SIDs) and/or Group IDs (GIDs) and/or Network IDs (NIDs) associated with one or more preferred service providers. The SID is a binary identification value uniquely assigned to a mobile phone system, the GID is a subset of the most significant bits of the SID that are used to identify a group of mobile phone systems, e.g., those mobile phone systems operated by AirTouch Communications, Inc., the assignee of the present invention, or other service providers, and the NID indicates the location within that Major Trading Area (MTA) serviced by the mobile phone system. The SID, GID, and/or NID are typically embedded within control data transmitted by the mobile phone system.

In a roaming situation outside the mobile phone's home service area, the mobile phone may have to scan a large number of frequency bands in order to identify a preferred system. For example, according to the presently allocated spectrum, the mobile phone may have to scan: 1) Cellular Band A; 2) Cellular Band B; 3) PCS Band A; 4) PCS Band B; 5) PCS Band C; 6) PCS Band D; 7) PCS Band E; and 8) PCS Band F. Of course, those skilled in the art will recognize that, in the future, the mobile phone may have to also scan other allocated spectrums.

In addition, beginning in 1996, the FCC has allowed current license holders of particular frequency bands to sell or lease sub-bands to other service providers. Thus, in a roaming situation outside the mobile phone's home service area, the mobile phone may also have to scan a large number of sub-bands as well.

As a result, it is difficult and time-consuming for a roaming mobile phone to locate a preferred system due to the large number of possible frequency bands, sub-bands, and possible setup channels that may have to be scanned by the mobile phone. Indeed, users may not have the patience to wait for this scanning process to complete. Thus, there is a need in the art for methods of rapid system access and registration for roaming mobile phones.

SUMMARY OF THE INVENTION

To overcome the limitations in the prior art described above, and to overcome other limitations that will become apparent upon reading and understanding the present specification, the present invention discloses a method, apparatus, and article of manufacture for rapid system access and registration of mobile phones when the mobile phone operates in an area outside of its home service area. A preferred mobile phone system for a mobile phone is identified before the mobile phone originates a call by determining a location for the mobile phone and selecting the preferred system from a database stored in the mobile phone using the determined location.

BRIEF DESCRIPTION OF THE DRAWINGS

Referring now to the drawings in which like reference numbers represent corresponding parts throughout:

FIGS. 4 and 5 illustrate possible structures for the knowledge base according to the present invention.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention discloses a method for rapid system access and registration for a mobile phone when the mobile phone operates in an area outside of its home service area. Generally, special agreements between service providers allow for unrestricted roaming by their respective subscribers. Charges incurred by the roaming subscriber are transmitted back to the service provider in the home service area, which pays the service provider of the foreign service area and then, in turn, bills the subscriber. Accordingly, it is desirable that a roaming mobile phone use the same system or a preferred system (by a preferred service provider) for reasons such as economical or technical advantages.

According to the present invention, the first step for rapid system access and registration is for the mobile phone to determine its location from information gleaned from one or more channels in one or more frequency bands that may not be the frequency bands desired for actual operation. For example, a mobile phone, when turned on, may scan for available channels in a particular frequency band. The mobile phone monitors the channels until it identifies a SID, GID, and/or NID transmitted by the mobile phone system. Using this SID, GID, and/or NID, the mobile phone identifies its current location from a comparison with stored information and uses a computer-implemented method to identify a preferred system for the location, including frequency band, setup channels (if any), and system type (if necessary). Generally, this computer-implemented method is used when the mobile phone monitors a nationwide system, such as analog cellular. In addition, this computer-implemented method typically relies on one or more computer programs executed by a microprocessor within the mobile phone and a database of information stored in a memory within the mobile phone.

Mobile Phone System

Figure 1:
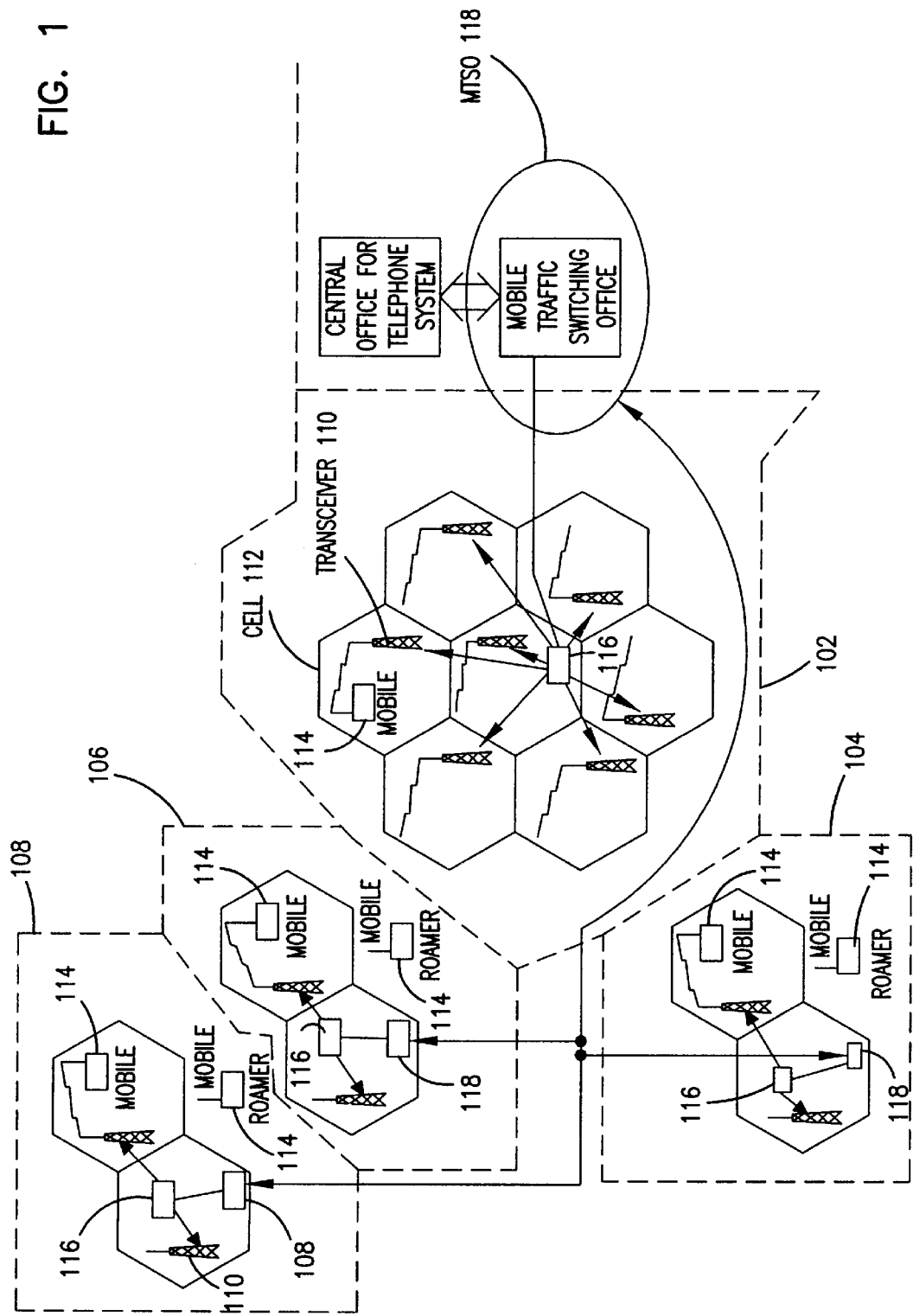
FIG. 1 is a block diagram illustrating a plurality of mobile phone systems according to the present invention.

FIG. 1 is a block diagram illustrating a plurality of mobile phone systems 102, 104, 106, 108 according to the present invention. Each of these mobile phone systems 102, 104, 106, 108 may comprise a cellular phone system, PCS phone system, ESMR phone system, or other radio telephone system. In addition, each of these mobile phone systems 102, 104, 106, 108 may be operated by the same or different service providers. Further, each of these mobile phone systems 102, 104, 106, 108 may operate on any one or more of a number of different frequency bands.

For example, according to the presently allocated spectrum, the mobile phone systems 102, 104, 106, 108 may operate on the following frequency bands: 1) Cellular Band A; 2) Cellular Band B; 3) PCS Band A; 4) PCS Band B; 5) PCS Band C; 6) PCS Band D; 7) PCS Band E; and 8) PCS Band F. Of course, those skilled in the art will recognize that, in the future, the mobile phone systems 102, 104, 106, 108 may also operate within other frequency bands. In addition, those skilled in the art will recognize that the mobile phone systems 102, 104, 106, 108 may also operate within sub-portions of any frequency band.

The basic concept of each of the mobile phone systems 102, 104, 106, 108 is to increase the availability of mobile phone service by reducing the area covered by transceivers 110. In this way, concentrated areas of usage have more transceivers 110, and thus more channels, because each transceiver 110 handles a given number of conversations.

The service area for each of the mobile phone systems 102, 104, 106, 108 is divided into regions called cells 112, each of which has the necessary equipment to transmit and receive calls to and from any mobile phone 114 located in the cell 112. Generally, transceivers 110 in each cell 112 can transmit and receive on a plurality of channels.

Each cell 112 usually has at least one setup channel dedicated to signaling between the cell 112 and mobile phones 114 within the cell 112. Setup channels can be classified by usage into two types: access channels and paging channels. An access channel is used for mobile-originating calls and paging channels are used for land-originating calls. The remaining channels are used for conversation.

The transceivers 110 in one or more of the cells 112 are controlled by one or more base station controllers (BSC) 116. The base site controllers 116 within each of the mobile phone systems 102, 104, 106, 108 are interconnected and controlled by one or more Mobile Telecommunications Switching Offices (MTSOs) 118.

An MTSO 118 is basically a telephone switching office as far as hardware is concerned, but includes a substantial amount of additional equipment for controlling the mobile phone systems 102, 104, 106, 108. The MTSOs 118 not only connects the mobile phone systems 102, 104, 106, 108 to the land-based telephone network, but also directly or indirectly connects each of the mobile phone systems 102, 104, 106, 108 to one another.

Each of the mobile phone systems 102, 104, 106, 108 is identified by a System Identification Number (SID) and/or a Group Identification Number (GID) and/or a Network Identification Number (NID). Generally, a mobile phone 114 is programmed with a SID, GID, and/or NID at subscription time, and identifies a preferred system (operated by a preferred service provider) by scanning for frequency bands for the SIDs, GIDs, and/or NIDs. Often, the sequence of frequency bands to be scanned is specified at subscription time, to ensure that the frequency band of the preferred system in the home service area of the mobile phone 114 is scanned first. Of course, as described above, in a roaming situation outside the home service area of the mobile phone 114, the mobile phone 114 may have to scan a large number of frequency bands in order to identify a preferred system.

Mobile Phone

Figure 2:
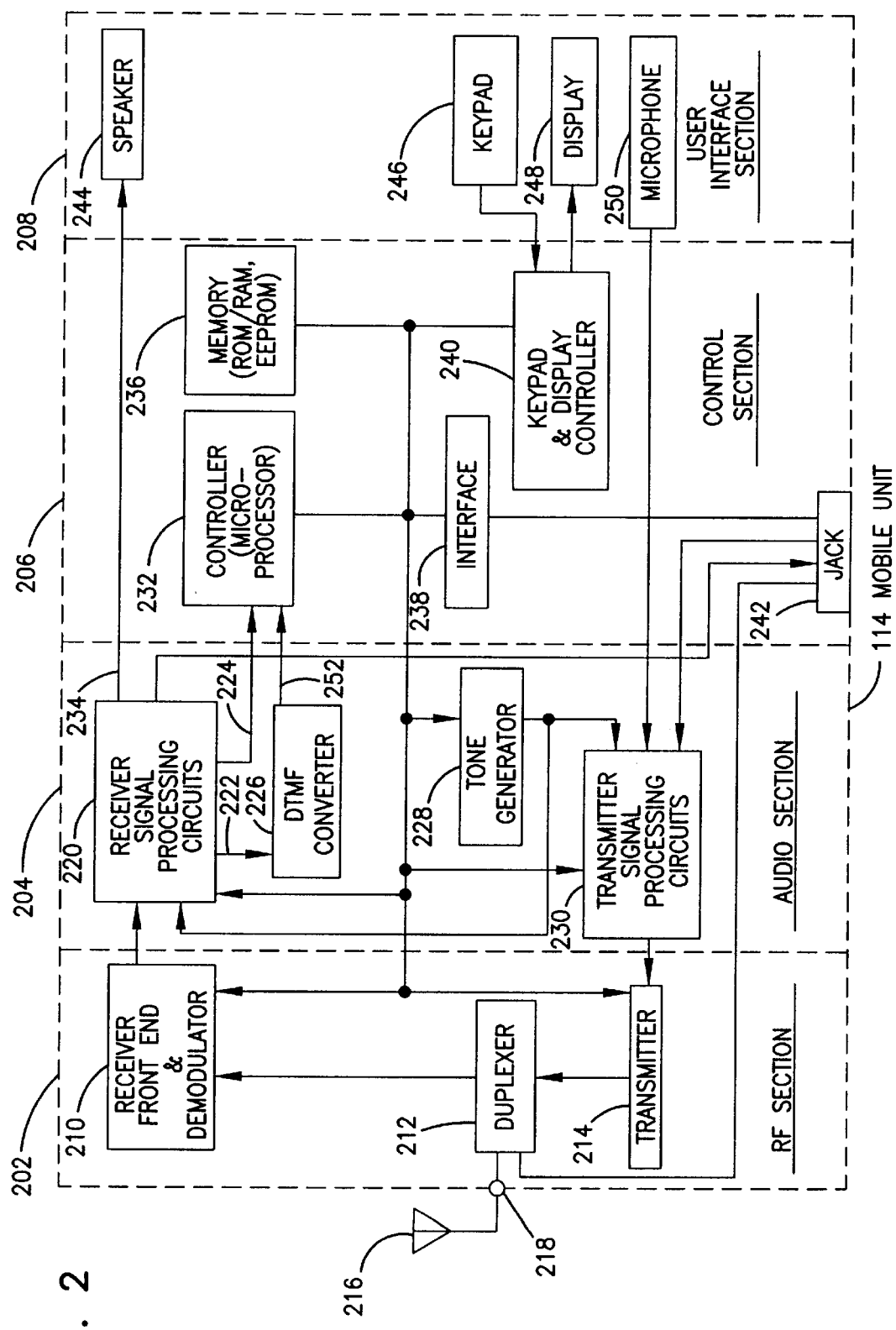
FIG. 2 is a block diagram of an exemplary embodiment of a mobile phone.

FIG. 2 is a block diagram of an exemplary embodiment of a mobile phone 114. Of course, those skilled in the art will recognize that this embodiment is provided for illustration purposes and is not intended to limit the present invention to exact structure shown. Indeed, those skilled in the art will recognize that other components and structures may be used for the mobile phone 114 without departing from the scope of the present invention.

A mobile phone 114 generally comprises a control unit, transceiver, and antenna. Each mobile phone 114 usually has a unique electronic serial number (ESN). Additionally, each mobile phone 114 usually is assigned a 10-digit telephone number, known as a mobile identification number (MIN).

In this embodiment, the mobile phone 114 contains an RF section 202, an audio section 204, a control section 206, and a user interface section 208. The RF section 202 contains a receiver 210, a duplexer 212, and a transmitter 214. The duplexer 212 is connected to an antenna 216 of the mobile phone 114 via transmission line 218. The duplexer 212 is also coupled to the receiver 210 and the transmitter 214. When a signal is received by the antenna 216, the signal is directed by the duplexer 212 to the receiver 210. The receiver then passes this signal along to the audio section 204. When the mobile phone 114 emits signals from the transmitter 214, the transmitter 214 passes those signals along to the duplexer 212 which passes the signals on to the antenna 216 via transmission line 218.

The audio section 204 is comprised of receiver circuits 220, a Dual-Tone Multi-Frequency (DTMF) converter 226, a tone generator 228, and transmitter circuits 230. The receiver circuits are 220 coupled to the receiver 210, the DTMF converter 226 and the tone generator 228. The transmitter circuits 230 are coupled to the tone generator 228 and the transmitter 214. When a signal is received at the antenna 216, the receiver 210 demodulates the signal and strips off the carrier frequency such that the receiver circuit 220 can process the baseband signal. Some signals will include DTMF signals, which are tonal equivalents to numbers or characters on the key pad. The receiver circuit 220 passes those DTMF tones along to the DTMF converter 226 via path 222. Control signals received at the receiver circuit 220 will be passed to the controller 232 in the control section 206 via path 224. Audio signals will be sent from the receiver circuit 220 to the speaker 244 in the user interface section 208 via path 234. The tone generator 228 generates tones for the receiver circuit 220 so a user can hear the tones associated with the numerical keys being depressed by the user. The tone generator 228 also generates tones for the transmitter circuit 230 so that those tones can be passed on to the transmitter 214 and transmitted to the mobile phone system via antenna 216.

The control section 206 is comprised of controller 232, memory 236, interface 238, keypad controller 240, and jack 242. The controller 232 is coupled to the memory 236, the keypad controller 240, and the interface 238. The jack 242 is coupled to the interface 238, the duplexer 212, the receiver circuit 220, and the transmitter circuit 230. The keypad controller 240, in addition to being coupled to the controller 232, is coupled to the display 248 and the keypad 246, located in the user interface section 208.

The controller 232 receives inputs from the receiver circuit 220 via path 224 and from the DTMF converter 226 via path 222. Using these inputs, the controller 232 accesses the memory 236 to send proper commands to other units within the mobile phone 114. For example, when a user presses a key on the keypad 246, a signal is sent to the keypad controller 240, which sends a signal to the receiver circuit 220 indicating which key was pressed. The receiver circuit 220 sends a signal to the controller 232 via path 224, which then sends a signal to the keypad controller 240 to show the user which key was pressed via display 248.

Interface 238 allows an external connection to the controller 232 via jack 242. Jack 242 also allows external connections to receiver circuit 220, transmitter circuit 230, and duplexer 212 for such items as facsimile machines and modems.

The user interface section 208 is comprised of speaker 244, display 248, keypad 246, and microphone 250. Speaker 244 is coupled to receiver circuit 220. Keypad 246 and display 248 are coupled to keypad controller 240, and microphone 250 is coupled to transmitter circuit 230.

Rapid System Access and Registration

Figure 3:
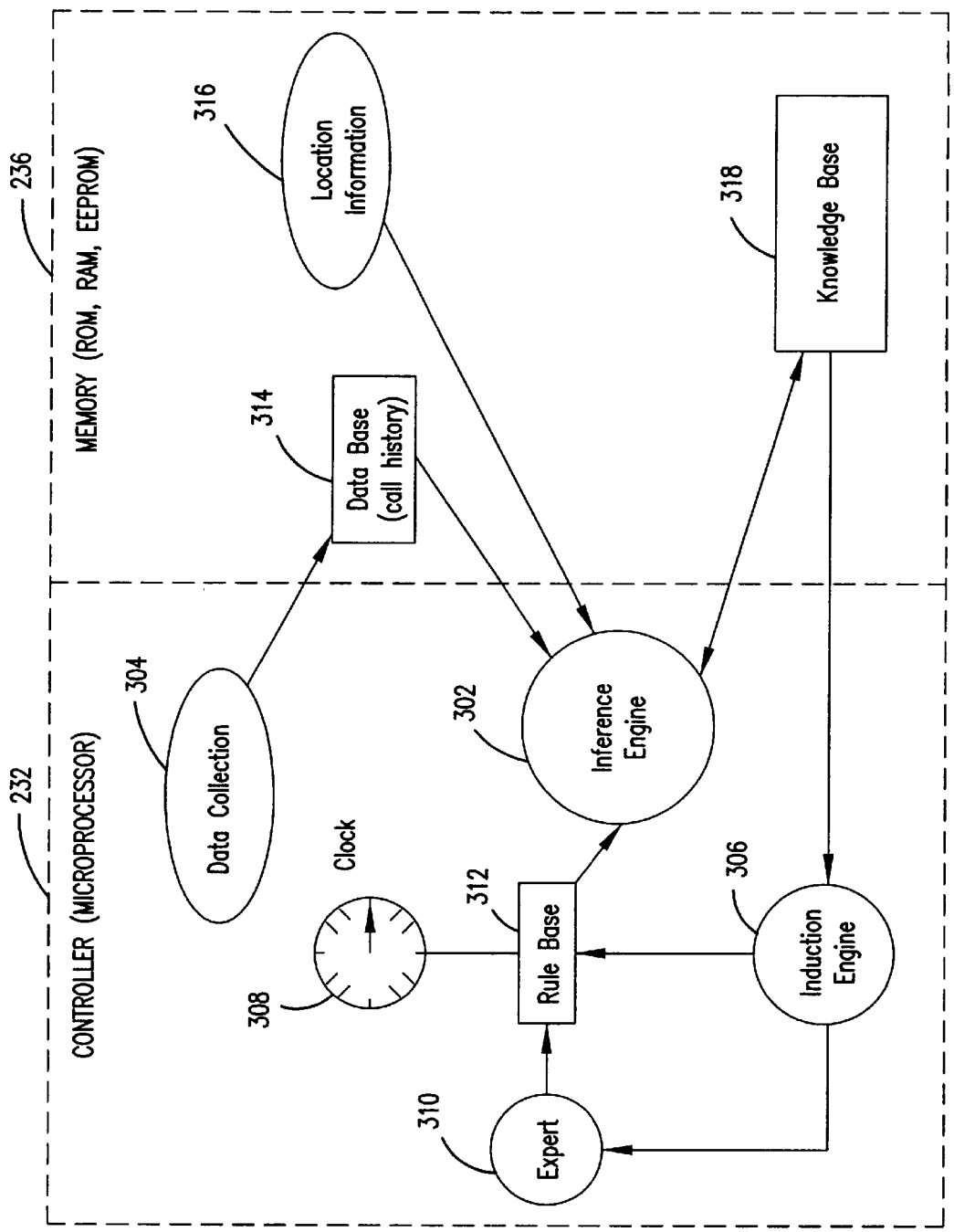
FIG. 3 is a block diagram that illustrates the structures, components, and environment of the present invention.

FIG. 3 is a block diagram that illustrates the structures, components, and environment of the present invention. In general, the present invention is implemented using computer programs and databases stored in the memory 236 of the mobile phone 114 and executed by the microprocessor 232 of the mobile phone 114. These computer programs and databases are comprised of instructions and data which, when read, executed, and/or interpreted by the microprocessor 232, causes the mobile phone 114 to perform the steps necessary to implement and/or use the present invention. The computer programs may include an inference engine 302, data collection 304, induction engine 306, clock 308, expert system 310, and rule base 312, while the databases may include a call history database 314, location information 316, and knowledge base 318. Of course, those skilled in the art will recognize that some or all of these components may or may not be present without departing from the scope of the present invention.

Generally, the computer programs and databases are embodied in memory 236 of the mobile phone 114. Of course, the computer programs and databases must be loaded into the memory 236 of the mobile phone 114 using one of a number of different techniques, such as programming via the keypad 246, downloading via interfacing to an external system via the jack 242, downloading via communications on a radio frequency (RF) channel, etc. Generally, the computer programs and database are programmed and/or stored into the mobile phone 114 by the service provider at subscription time and may be updated manually or automatically by itself, the user, or the service provider using any one of a number of different methods. Thus, the present invention may be implemented as a method, apparatus, or article of manufacture using standard programming and/or engineering techniques to produce software, firmware, hardware, or any combination thereof.

Those skilled in the art will recognize that the structure, components, and environment illustrated in FIGS. 1, 2 and 3 are not intended to limit the present invention. Indeed, those skilled in the art will recognize that other structures, components, and environments may be used without departing from the scope of the present invention.

According to the present invention, the inference engine 302 uses information that may include but is not limited to one or more of the following: location information 316, call history information 314, date and time 308, derived information, and/or other information. The inference engine 302 matches the information with criteria from the rule base 312 using a heuristic approach to generate information for the knowledge base 318, which is comprised of, for example, preferred frequency band selections, paging channels for the preferred frequency band selections, and/or other information that meet criteria established by the rule base 312.

In one example, if the mobile phone 114 has an analog cellular mode, it may scan either or both Cellular Bands A and B. Since the Cellular Bands are used/deployed everywhere in North America, the SID and/or NID from either or both Cellular Bands A and B can then be used to determine the location of the mobile phone 114. Once the location is determined, the present invention can identify one or more preferred systems.

Generally, the selection of Cellular Band A or B to scan first is a rule that is programmed at subscription time. Currently, most mobile phones 114 are cellular phones and preliminary evidence suggests that the majority of subscribers never roam from their home service area. Moreover, of those subscribers who occasionally roam, it is estimated that 75% to 85% limit their roaming to contiguous service areas or a regional service area close to their home service area. This leaves a mere 5% to 10% of subscribers who roam to distant locations within North America. This example uses this information to rapidly identify a preferred system.

In another example, if the mobile phone 114 does not have an analog cellular mode, it may scan either or both digital cellular Bands A and B and PCS Bands A and B to determine its location, wherein generally digital cellular or PCS Band A is tried first, and then digital cellular or PCS Band B. Although the PCS Bands A and B are deployed everywhere in North America, each PCS Band in one Major Trading Area (MTA) may use one of a number of different standards, so this embodiment is dependent on the mobile phone 114 being able to identify and/or use the standard present in PCS Band A or B. Again, once the location is determined, the present invention can identify one or more preferred systems.

In yet another example, the mobile phone 114 records information concerning its call history 314 and uses that information to first "guess" at the selection of one or more preferred systems. If the first "guess" is not successful, then the mobile phone 114 uses the technique of the previous example to determined its location.

In still another example, the user can enter their location using the keypad 246 of the mobile phone 114. This information is then used to identify one or more preferred systems.

Those skilled in the art will recognize that any number of methods beyond those described above can be used to determine the location of the mobile phone 114 without departing from the scope of the present invention. Indeed, those skilled in the art will recognize that any number of methods beyond those described above can be used to determine a preferred system without departing from the scope of the present invention.

Knowledge Base

FIGS. 4 and 5 illustrate possible structures for the knowledge base 318 according to the present invention. FIG. 4 illustrates a table stored in the memory of the mobile phone 114 that includes the SID 402, Location 404, Frequency Band 406, and Paging Channel 408; FIG. 5 illustrates a table stored in the memory of the mobile phone 114 that includes the SID 502, NID 504, Frequency Band 506, Paging Channel 508, # of Calls Made 510, Last Time 512, and Service Option 514 (for example, if the cell site is using Enhanced Variable Rate Code (EVRC) option).

Usually, the knowledge base 318 contains a number of usable frequency bands for a number of locations. If, for some reason, the first frequency band cannot be used, the system has the ability to supply second, third, or as many options as may be necessary until the possible solutions are exhausted. Such multiple solution information is stored in the knowledge base 318.

Initially, there will be little information in the knowledge base 318. At subscription time, the knowledge base 318 may be programmed by the service provider. Alternatively, the knowledge base 318, may be created automatically from the inference engine 302, based on the inputs from the call history database 314, location information 316, and the rule base 312. In addition, the knowledge base 318 may be enhanced through operation and monitoring of the system. Further, the knowledge base 318 may be updated, either manually or automatically, from time to time.

Rule Base

A typical application for the present invention might use any number of rules, wherein an initial set of rules may be loaded into the rule base 312 and/or provided by the expert system 310. Further, all the rules for the present invention are relatively simple. For example, the rules in the rule base 312 may comprise the form of "if conditions then do actions". The location information 316 is provided as input data to the rules. Then, the inference engine 302 interprets the rules:

Step 1: The information and condition of a rule are matched.

Step 2: A rule with a satisfied condition is selected.

Step 3: The actions specified in the selected rule are performed.

Step 4: Repeat for all rules.

Typical rules for the present system may be described as follows. In this example, a CDMA mobile phone 114 is roaming in a foreign system. The mobile phone 114 then uses the following rules:

1. If: Cellular band A is not CDMA, Then: scan Cellular band B.
2. If: location is in California, Then: scan PCS Band C first.
3. If: time is between 7:00 AM and 12:00 PM, Then: scan a sub-band of PCS Band D.

A feature of the present invention is a self-learning capability. The self-learning capability results from feedback to the rule base 312 or the induction engine 306 from the knowledge base 318, as shown by feedback paths in FIG. 3. For example, rules may be selected or deleted based on successful connections and this capacity for selecting rules or deleting rules may also be established in rule base 312. If the suggested connection obtained from the knowledge base 318 is successful, then the rules associated with this connection should be given greater relative weight than other rules. This weight will be communicated back to the rule base 312 from the knowledge base 318.

In FIG. 3, a feedback loop is shown from the knowledge base 318 to the rule base 312 by which modification of the rules can be made by selecting or deleting rules based on information in the knowledge base 318. The rules in the rule base 312 at the time when the system begins operation can be preprogrammed, or a set of rules can be derived by running various examples through the system. For example, the rules for the rule base 312 may be formulated by the induction engine 306, which operates by induction on information found in the knowledge base 318. In another example, the expert system 310 can either provide rules directly or give the examples which can be converted to rules by the induction engine 306. These features of the present invention allow for the possibility of growth in capabilities, includes the development of more efficient rules and additional improved criteria.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of identifying a preferred mobile phone system for a mobile phone before originating a call, comprising the steps of:

monitoring one or more channels of one or more frequency bands, in the mobile phone, until a mobile phone system identifier is received;

using the mobile phone system identifier to determine a location identifier for the mobile phone from a database stored in the mobile phone; and selecting a preferred mobile phone system for the mobile phone from the database stored in the mobile phone using the determined location identifier.

2. The method of claim 1, wherein the mobile phone system identifier is received from any one of a plurality of mobile phone systems.

3. The method of claim 1, wherein the database includes information related to the preferred mobile phone system selected from a group comprising a system identifier, network identifier, frequency band, paging channel, and service option.

4. The method of claim 1, wherein the record is retrieved using a system ID transmitted by a mobile phone system.

5. The method of claim 1, wherein the database comprises a knowledge base.

6. The method of claim 1, wherein the database comprises a call history for the mobile phone.

7. The method of claim 1, wherein the database comprises a rule base.

8. The method of claim 7, wherein the rule base is generated from a knowledge base.

9. The method of claim 8, wherein an inference engine matches location identifier determined from the mobile phone system identifier with criteria form the rule base using a heuristic approach to generate information for the knowledge base.

10. The method of claim 7, wherein the rule base is comprised of one or more rules of the form "if conditions then do actions".

11. The method of claim 10, wherein the conditions are matched with information selected from a group comprising location information, call history information, date and time information, and derived information.

12. The method of claim 10, wherein the rules are modified based on information in the knowledge base.

13. The method of claim 1, further comprising the step of selecting another preferred system from the database stored in the mobile phone using the determined location identifier associated with the mobile phone system identifier.

14. The method of claim 1, wherein the steps are performed by one or more computer programs executed by a processor in the mobile phone.

15. The method of claim 14, wherein the computer programs or databases are loaded into the memory of the mobile phone using one or more storage techniques selected from a group comprising programming the computer programs or databases into the memory of the mobile phone via a keypad, downloading the computer programs or databases into the memory of the mobile phone via interfacing to an external system, and downloading the computer programs or databases into the memory of the mobile phone via communications on a radio frequency (RF) channel.

16. The method of claim 14, wherein the computer programs or databases are updated manually or automatically by the mobile phone, the user, or the service provider.

17. A mobile phone for identifying a preferred mobile phone system before originating a call, comprising:
a transceiver coupled to an antenna; and
a processor, coupled to the transceiver and a memory, for controlling the transceiver, for monitoring one or more channels of one or more frequency bands received by the transceiver until a mobile phone system identifier is received, for using the mobile phone system identifier to determine a location for the mobile phone from a database stored in the mobile phone, and for selecting a preferred mobile phone system for the mobile phone from database stored in the memory of the mobile phone using the determined location identifier.

18. The mobile phone of claim 17, wherein the mobile phone system identifier is received from any one of a plurality of mobile phone systems.

19. The mobile phone of claim 17, wherein the database includes information related to the preferred mobile phone system selected from a group comprising a system identifier, network identifier, frequency band, paging channel, and service option.

20. The mobile phone of claim 17, wherein the record is retrieved using a system ID transmitted by a mobile phone system.

21. The mobile phone of claim 17, wherein the database comprises a knowledge base.

22. The mobile phone of claim 17, wherein the database comprises a call history for the mobile phone.

23. The mobile phone of claim 17, wherein the database comprises a rule base.

24. The mobile phone of claim 23, wherein the rule base is generated from a knowledge base.

25. The mobile phone of claim 24, wherein an inference engine matches the location identifier determined from the mobile phone system identifier with criteria from the rule base using a heuristic approach to generate information for the knowledge base.

26. The mobile phone of claim 23, wherein the rule base is comprised of one or more rules of the form "if conditions then do actions".

27. The mobile phone of claim 26, wherein the conditions are matched with information selected from a group comprising location information, call history information, date and time information, and derived information.

28. The mobile phone of claim 26, wherein the rules are modified based on information in the knowledge base.

29. The mobile phone of claim 17, wherein the processor selects another preferred system from the database stored in the mobile phone using the determined location identifier associated with the mobile phone system identifier.

30. The mobile phone of claim 17, wherein the processor executes one or more computer programs.

31. The mobile phone of claim 30, wherein the computer programs or databases are loaded into the memory of the mobile phone using one or more storage techniques selected from a group comprising programming the computer programs or databases into the memory of the mobile phone via a keypad, downloading the computer programs or databases into the memory of the mobile phone via interfacing to an external system, and downloading the computer programs or databases into the memory of the mobile phone via communications on a radio frequency (RF) channel.

32. The mobile phone of claim 30, wherein the computer programs or databases are updated manually or automatically by the mobile phone, the user, or the service provider.

* * * * *

UNITED STATES PATENT AND TRADEMARK OFFICE
CERTIFICATE OF CORRECTION

PATENT NO.     : 5,974,328
DATED          : October 26, 1999
INVENTOR(S)    : William Chien-Yeh Lee et al.

It is certified that error appears in the above-identified patent and that said Letters Patent is hereby corrected as shown below:

Abstract, line 1, "systems" should read -- system --.

Column 1,
Line 19, "end" should read -- and --.

Signed and Sealed this

Eighteenth Day of September, 2001

*Attest:*

*Attesting Officer*

NICHOLAS P. GODICI
*Acting Director of the United States Patent and Trademark Office*